US012079939B2

United States Patent
Hong

(10) Patent No.: US 12,079,939 B2
(45) Date of Patent: Sep. 3, 2024

(54) VIRTUAL TASTINGS AND GUIDED TOURS FOR AUGMENTED REALITY EXPERIENCES

(71) Applicant: Snap Inc., Santa Monica, CA (US)

(72) Inventor: Megan Hong, Playa Vista, CA (US)

(73) Assignee: Snap Inc., Santa Monica, CA (US)

( * ) Notice: Subject to any disclaimer, the term of this patent is extended or adjusted under 35 U.S.C. 154(b) by 134 days.

(21) Appl. No.: 17/737,323

(22) Filed: May 5, 2022

(65) Prior Publication Data

US 2022/0358729 A1 Nov. 10, 2022

Related U.S. Application Data

(60) Provisional application No. 63/185,406, filed on May 7, 2021.

(51) Int. Cl.
*G06T 19/00* (2011.01)
*G06F 3/0484* (2022.01)
(Continued)

(52) U.S. Cl.
CPC .......... *G06T 19/006* (2013.01); *G06F 3/0484* (2013.01); *G06F 3/0488* (2013.01);
(Continued)

(58) Field of Classification Search
CPC ............... G06F 2111/18; G06F 3/0481; G06F 3/04817; G06F 9/4443; G06F 3/04847;
(Continued)

(56) References Cited

U.S. PATENT DOCUMENTS

| 10,410,303 B1 | 9/2019 | Catalano |
| 2014/0304654 A1* | 10/2014 | Gross .................... G06F 3/0482 715/811 |

(Continued)

FOREIGN PATENT DOCUMENTS

| WO | 2015192117 A1 | 12/2015 |
| WO | 2017160920 A1 | 9/2017 |

OTHER PUBLICATIONS

Kaplan; Andrew; 2019; How AR Is Reinventing Drinks Marketing; https://daily.sevenfifty.com/how-ar-is-reinventing-drinks-marketing/ (Year: 2019).*
International Search Report and Written Opinion for International Application No. PCT/US2022/027801, dated Aug. 10, 2022 (Oct. 8, 2022)—13 pages.

*Primary Examiner* — Yu Chen
(74) *Attorney, Agent, or Firm* — Culhane PLLC; Stephen J. Weed

(57) ABSTRACT

Example systems, devices, media, and methods are described for presenting a virtual guided tour in the display of an eyewear device in an augmented reality experience. A guided tour application implements and controls the capturing of frames of video data within a field of view of the camera. The image processing system detects, in the captured frames of video data, one or more containers in the physical environment. The method includes retrieving data associated with the detected container and its contents from libraries and internet searches. A contextual overlay based on the retrieved data is presented on the display along with an avatar for playing messages, responding to commands and queries using speech recognition, and presenting guided tours. The experience includes virtual product tastings and guided tours through farms and related facilities.

16 Claims, 14 Drawing Sheets

(51) Int. Cl.
  *G06F 3/0488* (2022.01)
  *G06T 13/40* (2011.01)
  *G06V 20/70* (2022.01)
  *G10L 15/22* (2006.01)

(52) U.S. Cl.
  CPC .............. *G06T 13/40* (2013.01); *G06V 20/70* (2022.01); *G10L 15/22* (2013.01); *G10L 2015/223* (2013.01)

(58) Field of Classification Search
  CPC .... G06F 11/3664; G06F 3/012; G06F 3/0304; G06F 3/011–015; G06V 20/20; G06T 19/00; G06T 17/00; G06T 7/00; G06T 19/006; G06T 2215/16; H04N 5/272; H04N 2201/3245; A63F 13/10; G02B 27/017
  See application file for complete search history.

(56) References Cited

U.S. PATENT DOCUMENTS

| | | | | |
|---|---|---|---|---|
| 2014/0324624 | A1* | 10/2014 | Ward | H04W 4/021 |
| | | | | 705/26.7 |
| 2018/0329209 | A1 | 11/2018 | Nattukallingal | |
| 2019/0005716 | A1 | 1/2019 | Singh et al. | |
| 2019/0011703 | A1 | 1/2019 | Robaina et al. | |
| 2019/0102946 | A1 | 4/2019 | Spivack et al. | |
| 2019/0108578 | A1* | 4/2019 | Spivack | G09B 5/065 |
| 2020/0012916 | A1* | 1/2020 | Dolignon | G06N 3/006 |
| 2021/0074068 | A1 | 3/2021 | Spivack et al. | |
| 2022/0358729 | A1* | 11/2022 | Hong | G06V 20/70 |

* cited by examiner

VIRTUAL TASTINGS AND GUIDED TOURS FOR AUGMENTED REALITY EXPERIENCES

CROSS-REFERENCE TO RELATED APPLICATIONS

This application claims priority to U.S. Provisional Application Ser. No. 63/185,406 filed on May 7, 2021, the contents of which are incorporated fully herein by reference

TECHNICAL FIELD

Examples set forth in the present disclosure relate to the field of augmented reality experiences for electronic devices, including wearable devices such as eyewear. More particularly, but not by way of limitation, the present disclosure describes the presentation of virtual product tastings and guided tours of related facilities in augmented reality.

BACKGROUND

Many types of computers and electronic devices available today, such as mobile devices (e.g., smartphones, tablets, and laptops), handheld devices, and wearable devices (e.g., smart glasses, digital eyewear, headwear, headgear, and head-mounted displays), include a variety of cameras, sensors, wireless transceivers, input systems, and displays.

Virtual reality (VR) technology generates a complete virtual environment including realistic images, sometimes presented on a VR headset or other head-mounted display. VR experiences allow a user to move through the virtual environment and interact with virtual objects. Augmented reality (AR) is a type of VR technology that combines real objects in a physical environment with virtual objects and displays the combination to a user. The combined display gives the impression that the virtual objects are authentically present in the environment, especially when the virtual objects appear and behave like the real objects. Cross reality (XR) is generally understood as an umbrella term referring to systems that include or combine elements from AR, VR, and MR (mixed reality) environments.

Graphical user interfaces allow the user to interact with displayed content, including virtual objects and graphical elements such as icons, taskbars, list boxes, menus, buttons, and selection control elements like cursors, pointers, handles, and sliders.

Automatic speech recognition (ASR) is a field of computer science, artificial intelligence, and linguistics which involves receiving spoken words and converting the spoken words into audio data suitable for processing by a computing device. Processed frames of audio data can be used to translate the received spoken words into text or to convert the spoken words into commands for controlling and interacting with various software applications. ASR processing may be used by computers, handheld devices, wearable devices, telephone systems, automobiles, and a wide variety of other devices to facilitate human-computer interactions.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
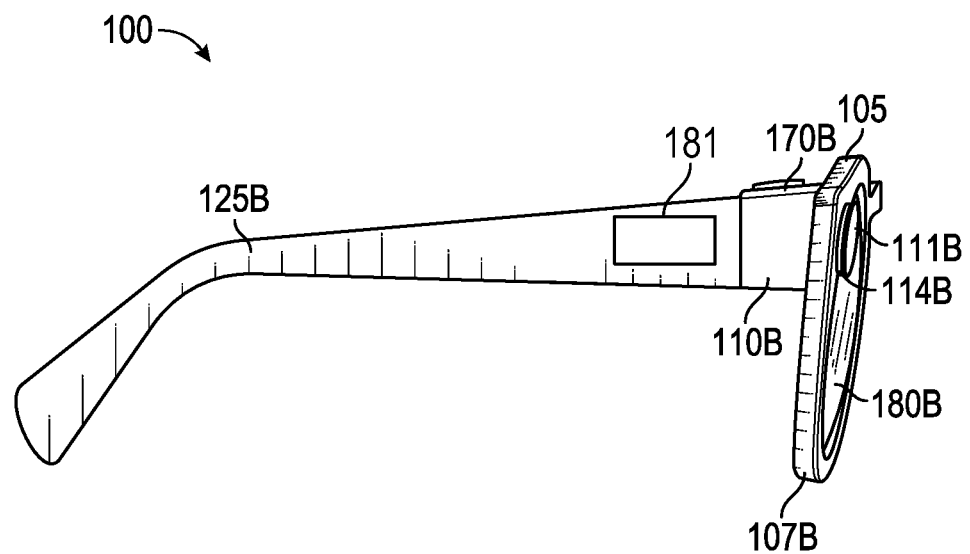
FIG. 1A is a side view (right) of an example hardware configuration of an eyewear device suitable for use in an example virtual guided tour system.

Various implementations and details are described with reference to examples for presenting virtual product tastings and virtual guided tours of product-related facilities in augmented reality. For example, a container such as a wine bottle is detected in video data captured by an eyewear device using computer vision and machine-trained classification models. Relevant data about the detected container (and its contents) is retrieved from libraries and internet searches. A contextual overlay based on the retrieved data is presented on the display along with an avatar for playing messages and presenting guided tours.

Example methods include presenting a contextual overlay and starting a virtual tour experience in response to detecting a container in a physical environment with an eyewear device. The eyewear device includes a camera system, a microphone, a loudspeaker, a guided tour application, an image processing system, and a display. The method includes detecting a first action in the captured frames of video data and, in response, starting the virtual tour experience, which includes presenting a video on the display in correlation with a lecture presented through the avatar. The virtual tour experience also includes animating the avatar to perform one or more demonstrations in correlation with a lesson. A graphical control element controls the progress of the tour experience. In the context of traditionally crafted beverages, the detected container holds a beverage product such as wine, beer, liquor, or cider. The virtual guided tour experience is associated with a locale such as a winery, brewery, distillery, or cidery, and may include a farm tour and a factory or facilities tour.

Although the various systems and methods are described herein with reference to containers and beverages, the technology described may be applied to detecting any type of container or product in a physical environment, retrieving data about the detected product, and presenting a virtual guided tour on a display.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices, coupled components, and any other devices such as those shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera, inertial measurement unit, or display as constructed or as otherwise described herein.

Advanced AR technologies, such as computer vision and object tracking, may be used to produce a perceptually enriched and immersive experience. Computer vision algorithms extract three-dimensional data about the physical world from the data captured in digital images or video. Object recognition and tracking algorithms are used to detect an object in a digital image or video, estimate its orientation or pose, and track its movement over time. Hand and finger recognition and tracking in real time is one of the most challenging and processing-intensive tasks in the field of computer vision.

The term "pose" refers to the static position and orientation of an object at a particular instant in time. The term "gesture" refers to the active movement of an object, such as a hand, through a series of poses, sometimes to convey a signal or idea. The terms, pose and gesture, are sometimes used interchangeably in the field of computer vision and augmented reality. As used herein, the terms "pose" or "gesture" (or variations thereof) are intended to be inclusive of both poses and gestures; in other words, the use of one term does not exclude the other.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device such as a touchpad 181. As shown, the touchpad 181 may have a boundary that is plainly visible or include a raised or otherwise tactile edge that provides feedback to the user about the location and boundary of the touchpad 181; alternatively, the boundary may be subtle and not easily seen or felt. In other implementations, the eyewear device 100 may include a touchpad 181 on the left side that operates independently or in conjunction with a touchpad 181 on the right side.

The surface of the touchpad 181 is configured to detect finger touches, taps, and gestures (e.g., moving touches) for use with a GUI displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Tapping or double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear device 100 includes a right visible-light camera 114B. As further described herein, two cameras 114A, 114B capture image information for a scene from two separate viewpoints. The two captured images may be used to project a three-dimensional display onto an image display for viewing with 3D glasses.

Figure 1B:
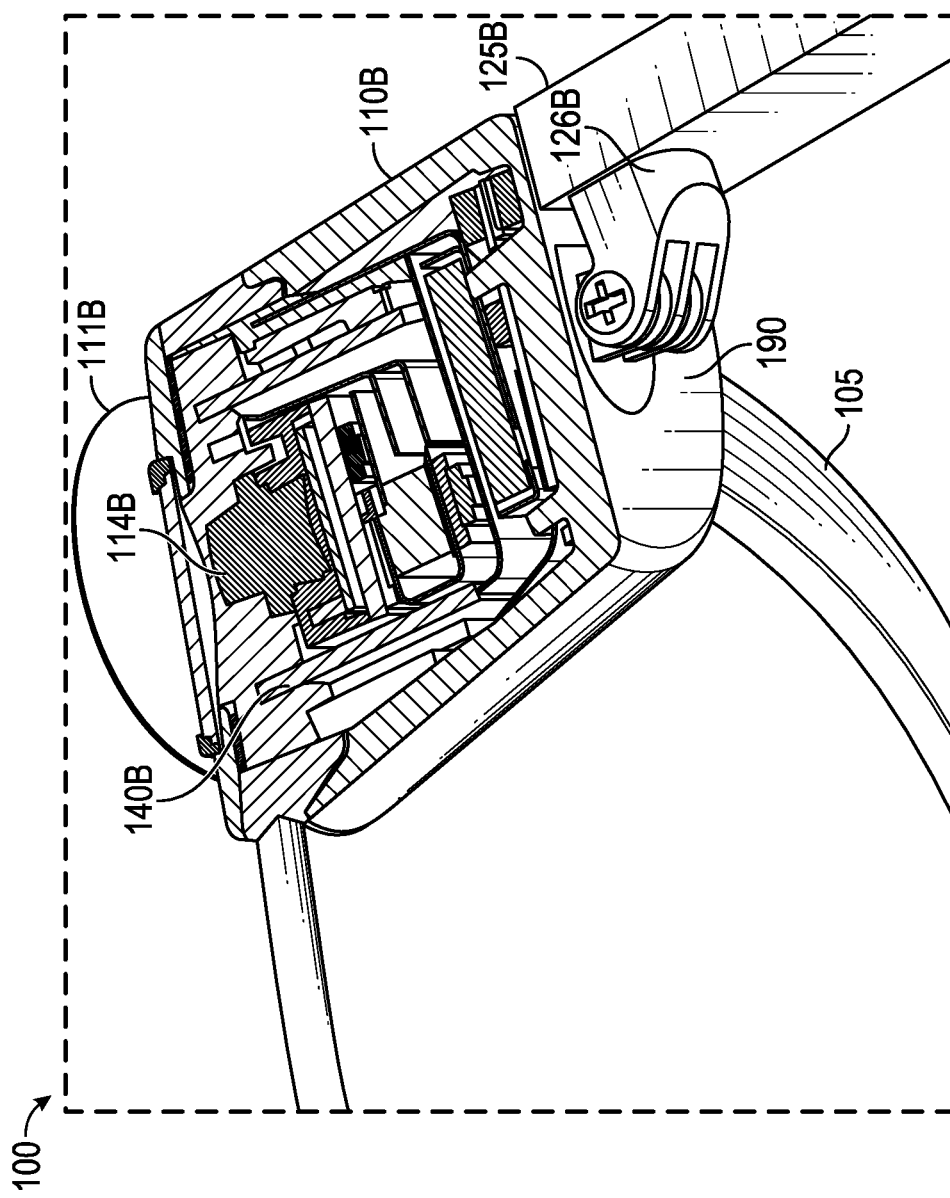
FIG. 1B is a perspective, partly sectional view of a right corner of the eyewear device of FIG. 1A depicting a right visible-light camera, and a circuit board.
Figure 1C:
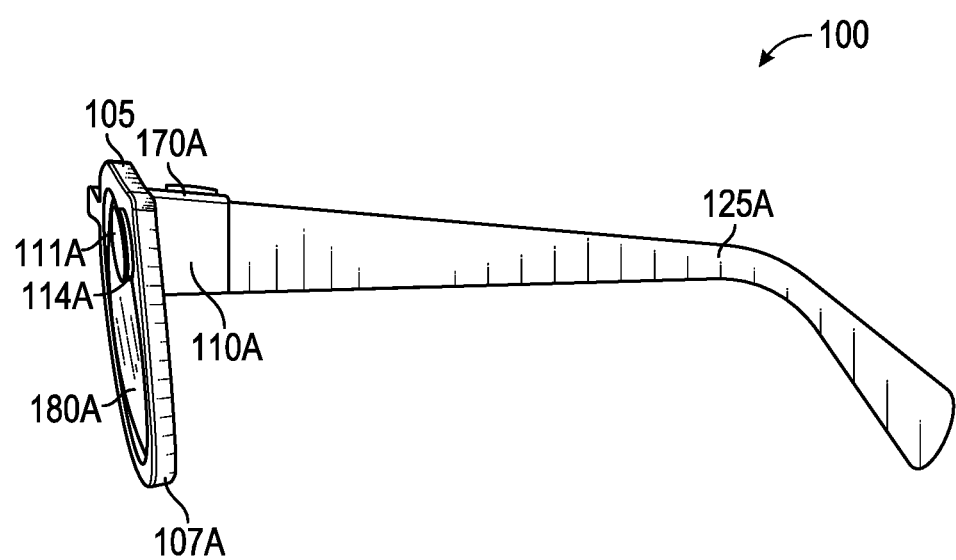
FIG. 1C is a side view (left) of an example hardware configuration of the eyewear device of FIG. 1A, which shows a left visible-light camera.
Figure 1D:
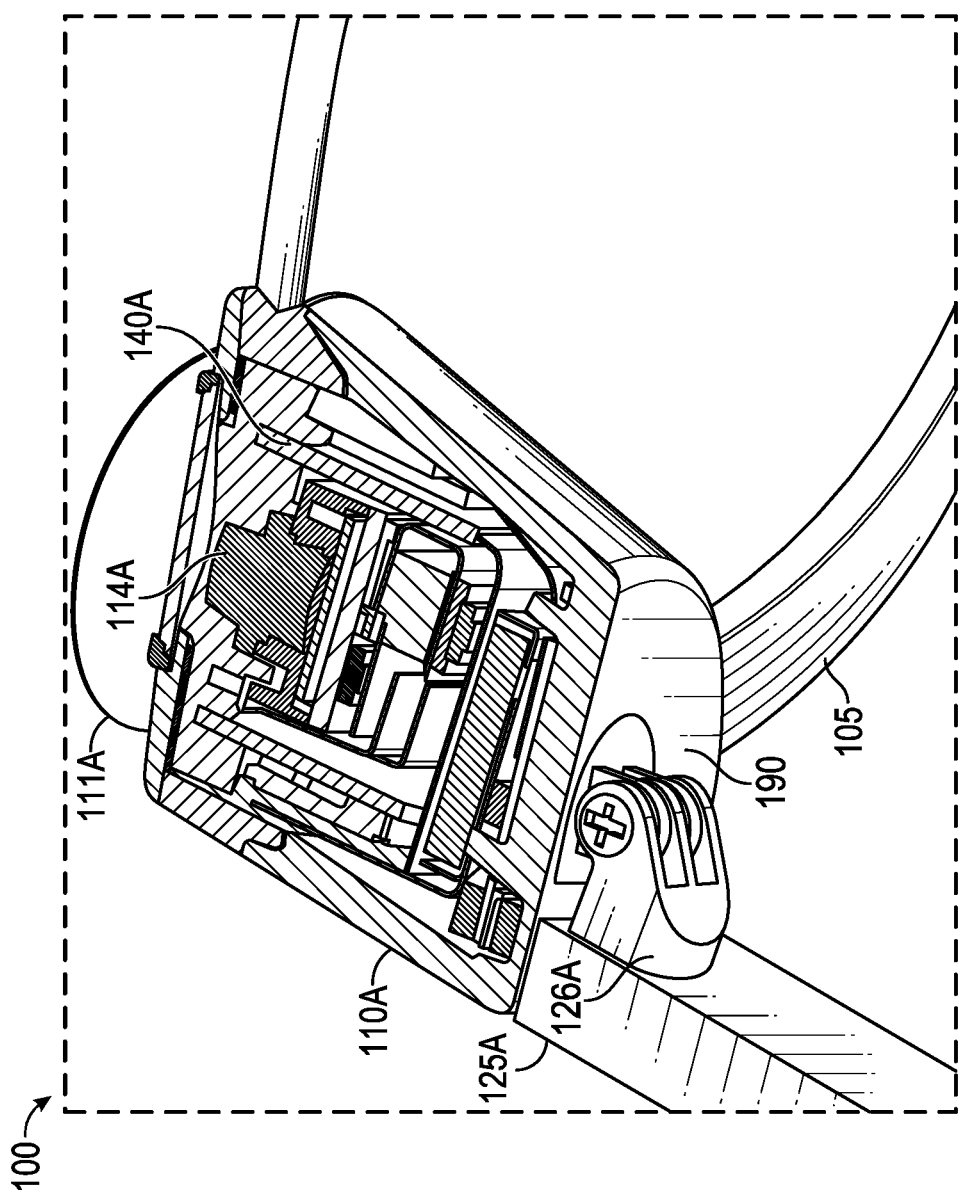
FIG. 1D is a perspective, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Figure 3:
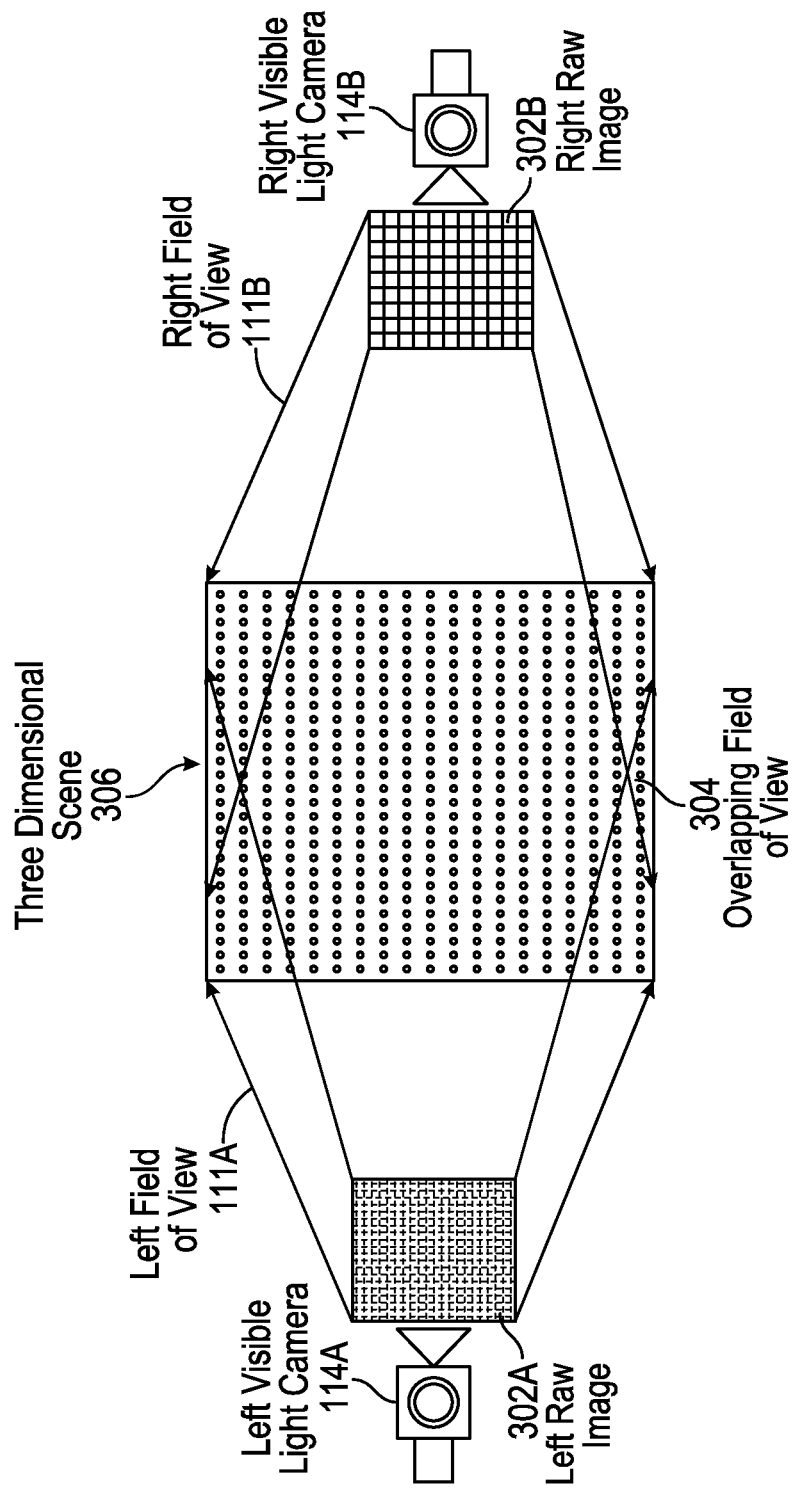
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example configuration, one or both visible-light cameras 114A, 114B has a field of view of 100° and a resolution of 480×480 pixels. The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 480p (e.g., 640×480 pixels), 720p, 1080p, or greater. Other examples include visible-light cameras 114A, 114B that can capture high-definition (HD) video at a high frame rate (e.g., thirty to sixty frames per second, or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412, or another processor, controls operation of the visible-light cameras 114A, 114B to act as a stereo camera simulating human binocular vision and may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 1B is a perspective, cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a perspective, cross-sectional view of a left corner 110A of the eyewear device of FIG. 1C depicting the left visible-light camera 114A of the three-dimensional camera, and a circuit board.

Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). A right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B. A left hinge 126B connects the left corner 110A to a left temple 125A of the eyewear device 100. In some examples, components of the left visible-light camera 114A, the flexible PCB 140A, or other electrical connectors or contacts may be located on the left temple 125A or the left hinge 126A.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s) 139, loudspeaker(s) 191, low-power wireless circuitry (e.g., for wireless short range network communication via Bluetooth™), high-speed wireless circuitry (e.g., for wireless local area network communication via Wi-Fi).

Figure 2A:
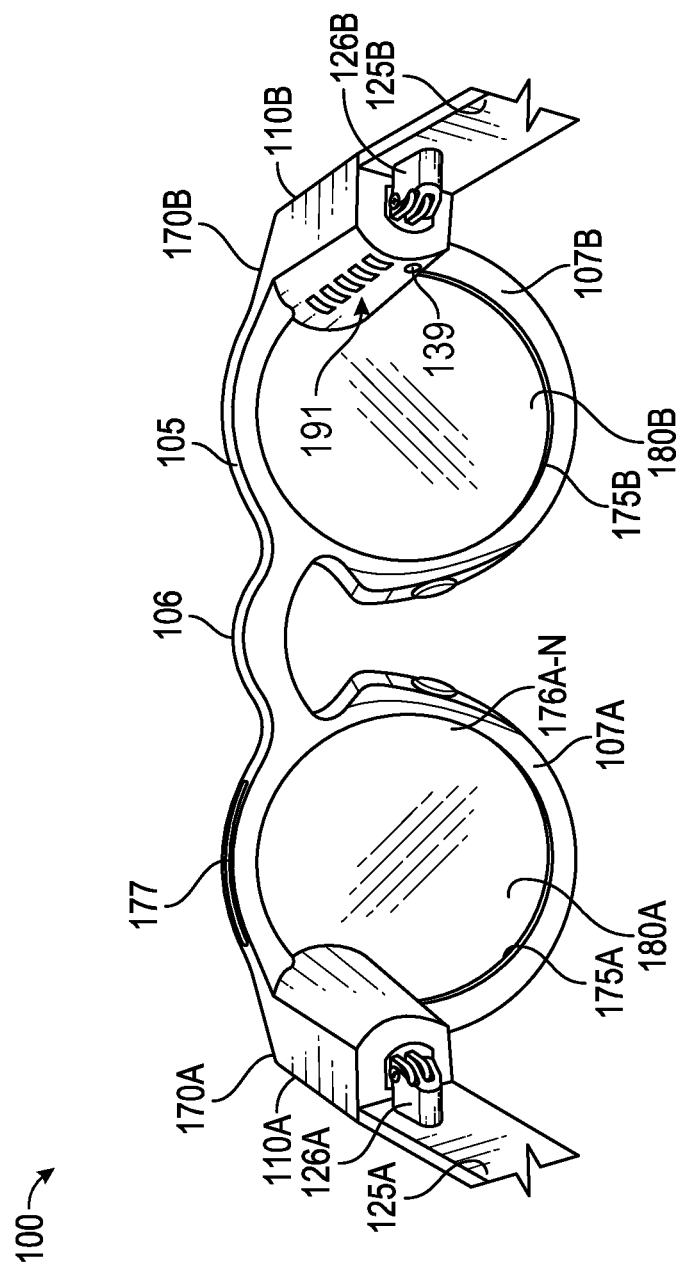
FIGS. 2A and 2B are rear views of example hardware configurations of an eyewear device utilized in an example virtual guided tour system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
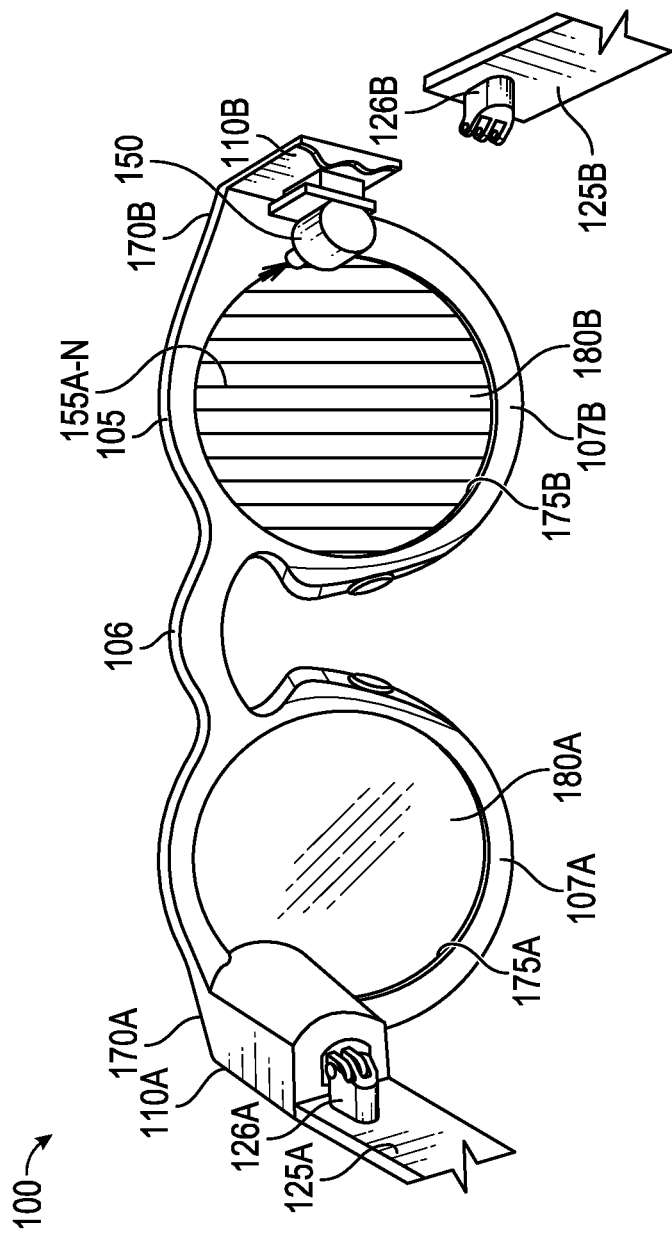

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge or diverge or that cause little or no convergence or divergence.

FIG. 2A is an example hardware configuration for the eyewear device 100 in which the right corner 110B supports a microphone 139 and a loudspeaker 191. The microphone 139 includes a transducer that converts sound into a corresponding electrical audio signal. The microphone 139 in this example, as shown, is positioned with an opening that faces inward toward the wearer, to facilitate reception of the sound waves, such as human speech including verbal commands and questions. Additional or differently oriented openings may be implemented. In other example configurations, the eyewear device 100 is coupled to one or more microphones 139, configured to operate together or independently, and positioned at various locations on the eyewear device 100.

Figure 4:
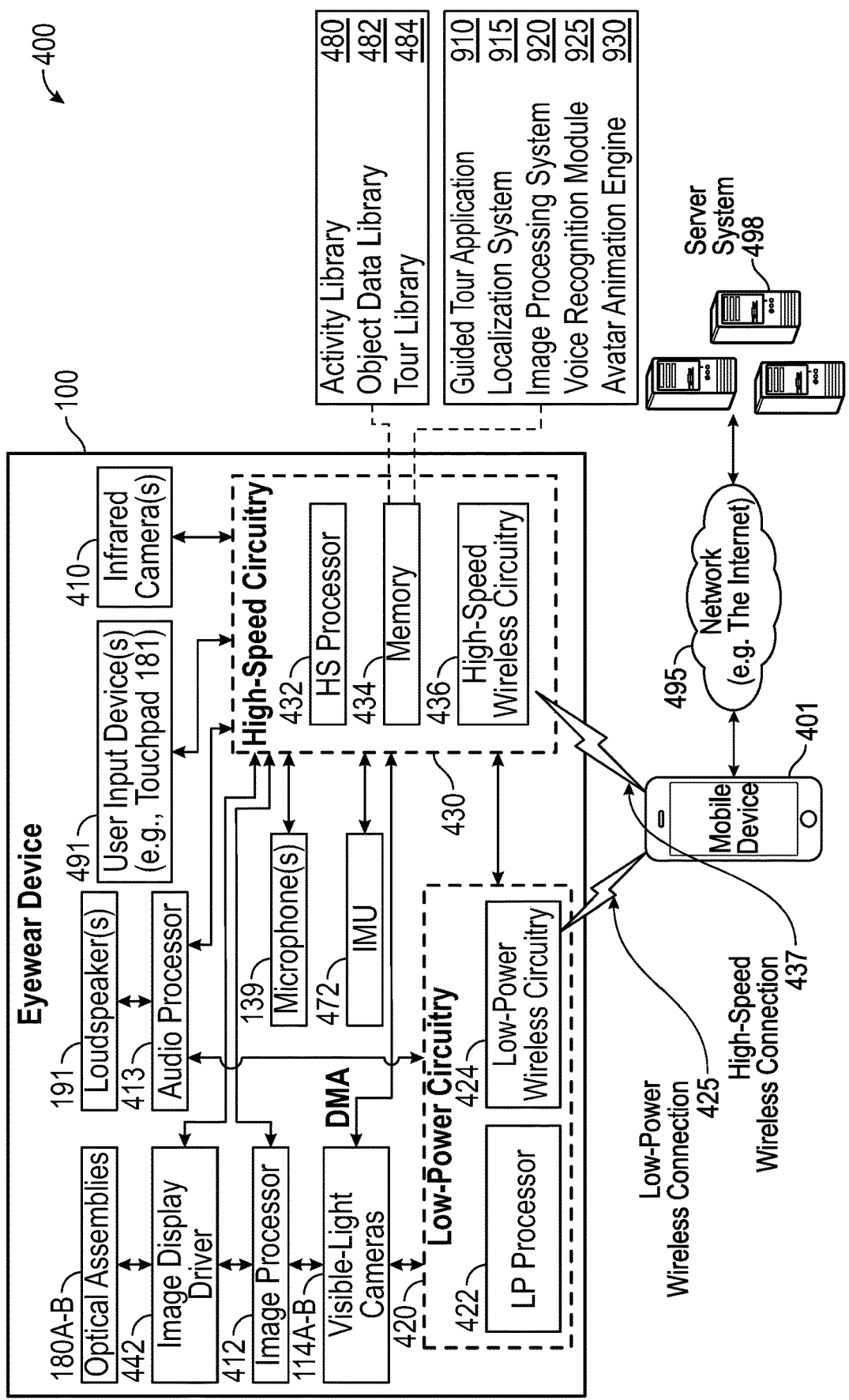
FIG. 4 is a functional block diagram of an example virtual guided tour system including an eyewear device and a server system connected via various networks.

The loudspeaker 191 includes an electro-acoustic transducer that converts an electrical audio signal into a corresponding sound. The loudspeaker 191 is controlled by one of the processors 422, 432 or by an audio processor 413 (FIG. 4). The loudspeaker 191 in this example includes a series of oblong apertures, as shown, that face inward to direct the sound toward the wearer. Additional or differently oriented apertures may be implemented. In other example configurations, the eyewear device 100 is coupled to one or more loudspeakers 191, configured to operate together (e.g., in stereo, in zones to generate surround sound) or independently, and positioned at various locations on the eyewear device 100. For example, one or more loudspeakers 191 may be incorporated into the frame 105, temples 125, or corners 110A, 110B of the eyewear device 100.

Although shown in FIG. 2A and FIG. 2B as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector (not shown) and a right projector 150. The left optical assembly 180A may include a left display matrix (not shown) or a left set of optical strips (not shown) which are configured to interact with light from the left projector. Similarly, the right optical assembly 180B may include a right display matrix (not shown) or a right set of optical strips 155A-N, which are configured to interact with light from the right projector 150. In this example, the eyewear device 100 includes a left display and a right display.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a timestamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the virtual guided tour system 400 (FIG. 4) includes the eyewear device 100, which includes a frame 105 and a left temple 125A extending from a left lateral side 170A of the frame 105 and a right temple 125B extending from a right lateral side 170B of the frame 105. The eyewear device 100 may further include at least two visible-light cameras 114A, 114B having overlapping fields of view. In one example, the eyewear device 100 includes a left visible-light camera 114A with a left field of view 111A, as illustrated in FIG. 3. The left camera 114A is connected to the frame 105 or the left temple 125A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

FIG. 4 is a functional block diagram of an example virtual guided tour system 400 that includes an eyewear device 100), a mobile device 401, and a server system 498 connected via various networks 495 such as the Internet. As shown, the virtual guided tour system 400 includes a low-power wireless connection 425 and a high-speed wireless connection 437 between the eyewear device 100 and the mobile device 401.

As shown in FIG. 4, the eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include a depth sensor that uses infrared signals to estimate the position of objects relative to the device 100. The depth sensor in some examples includes one or more infrared emitter(s) and infrared camera(s) 410.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images, video images, or still and video images. The image display driver 442 is coupled to the image displays of each optical assembly 180A, 180B in order to control the display of images.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

As shown in FIG. 4, various elements of the eyewear device 100 can be coupled to the low-power circuitry 420, high-speed circuitry 430, or both. For example, the infrared camera 410 (including in some implementations an infrared emitter), the user input devices 491 (e.g., touchpad 181), the microphone(s) 139, and the IMU 472 may be coupled to the low-power circuitry 420, high-speed circuitry 430, or both.

Figure 5:
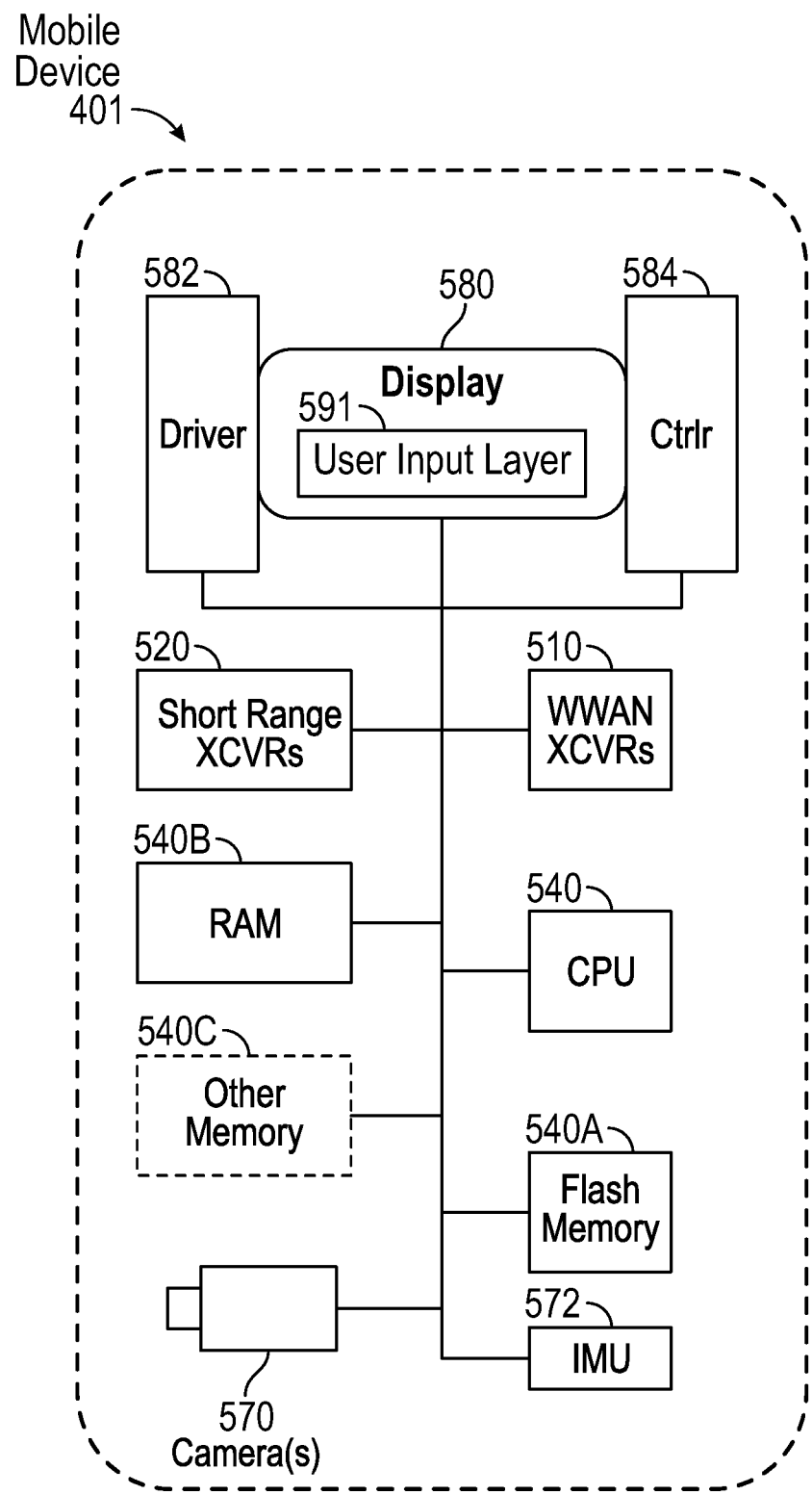
FIG. 5 is a diagrammatic representation of an example hardware configuration for a mobile device suitable for use in the example virtual guided tour system of FIG. 4.

As shown in FIG. 5, the CPU 540 of the mobile device 401 may be coupled to a camera system 570, a mobile display driver 582, a user input layer 591, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker 191, or a vibrating actuator), or an outward-facing signal (e.g., an LED, a loudspeaker 191). The image displays of each optical assembly 180A, 180B are driven by the image display driver 442. In some example configurations, the output components of the eyewear device 100 further include additional indicators such as audible elements (e.g., loudspeakers 191), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, one or more speakers 191 positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker 191, or an actuator that is configured and positioned to be sensed by an observer.

The input components of the eyewear device 100 may include alphanumeric input components (e.g., a touch screen or touchpad 181 configured to receive alphanumeric input, a photo-optical keyboard, or other alphanumeric-configured elements), pointer-based input components (e.g., a mouse, a touchpad 181, a trackball, a joystick, a motion sensor, or other pointing instruments), tactile input components (e.g., a button switch, a touch screen or touchpad 181 that senses the location, force or location and force of touches or touch gestures, or other tactile-configured elements), and audio input components (e.g., a microphone 139), and the like. The mobile device 401 and the server system 498 may include alphanumeric, pointer-based, tactile, audio, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The virtual guided tour system 400, as shown in FIG. 4, includes a computing device, such as mobile device 401, coupled to an eyewear device 100 over a network. The virtual guided tour system 400 includes a memory for storing instructions and a processor for executing the instructions. Execution of the instructions of the virtual guided tour system 400 by the processor 432 configures the eyewear device 100 to cooperate with the mobile device 401. The virtual guided tour system 400 may utilize the memory 434 of the eyewear device 100 or the memory elements 540A, 540B, 540C of the mobile device 401 (FIG. 5). Also, the virtual guided tour system 400 may utilize the processor elements 432, 422 of the eyewear device 100 or the central processing unit (CPU) 540 of the mobile device 401 (FIG. 5). In addition, the virtual guided tour system 400 may further utilize the memory and processor elements of the server system 498. In this aspect, the memory and processing functions of the virtual guided tour system 400 can be shared or distributed across the processors and memories of the eyewear device 100, the mobile device 401, and the server system 498.

The memory 434, in some implementations, includes or is coupled to an activity library 480, an object data library 482, and a tour library 484. The activity library 480 includes and stores a plurality of predefined activities 850, as described herein, which are useful in determining whether a detected action in the physical environment substantially matches one of the predefined activities 850 as defined and stored in the activity library 480. The object data library 482 includes and stores a plurality of predefined objects, such as containers and vessels, as described herein, which are useful in determining whether a detected container in the physical environment substantially matches one of the predefined objects as defined and stored in the object data library 482.

The tour library 484 includes and stores a plurality of predefined guided tours. For example, in some implementations, the data record associated with a tour includes a title, one or more segment titles, an avatar 710; content associated with a contextual overlay 725 including interactive elements 730 and links 734 to additional content 726; content associated with a video 750 including video segments, still photographs, and slide presentations; and a lecture 872 including narrations, lessons, and guides (in both text and audio formats).

In some implementations, the memory 434 includes or is coupled to a guided tour application 910, a localization system 915, an image processing system 920, a voice recognition module 925, and an avatar animation engine 930. In a virtual guided tour system 400 in which a camera is capturing frames of video data 900, the guided tour application 910 configures the processor 432 to detect one or more containers or items, retrieve data 850 associated with the detected containers, and present a contextual overlay 725, as described herein. The localization system 915 configures the processor 432 to obtain localization data for use in determining the position of the eyewear device 100 relative to the physical environment. The localization data may be derived from a series of images, an IMU unit 472, a GPS unit, or a combination thereof. The image processing system 920 configures the processor 432 to present a contextual overlay 725, an avatar 710, and a variety of graphical elements 712, 720, 711, 721, 750 on a display of an optical assembly 180A, 180B in cooperation with the image display driver 442 and the image processor 412.

The voice recognition module 925 configures the processor 432 to perceive human speech, convert the received speech into frames of audio data 905, identify an inquiry based on the audio data 905, and assemble a response that is correlated to be responsive to the identified inquiry.

The avatar animation engine 930 configures the processor 432 to render an avatar 710 as a still image or as a moving image (e.g., partially or fully animated), for presentation on a display of an optical assembly 180A, 180B in cooperation with the image display driver 442 and the image processor 412. The avatar 710 in some implementations is a cartoon-like character called a Bitmoji® which is rendered to appear three-dimensional. Predefined and configurable, Bitmoji® avatars are accessible over the network 495 and, in some implementations, are stored in the tour library 484 described herein.

FIG. 5 is a high-level functional block diagram of an example mobile device 401. Mobile device 401 includes a flash memory 540A which stores programming to be executed by the CPU 540 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a display controller 584. In the example of FIG. 5, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 591 for receiving input (by touch, multi-touch, or gesture, and the like, by hand, stylus, or other tool) and an image display 580 for displaying content As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The client device 401 in some examples includes a collection of motion-sensing components referred to as an inertial measurement unit (IMU) 572 for sensing the position, orientation, and motion of the client device 401. The motion-sensing components may be micro-electro-mechanical systems (MEMS) with microscopic moving parts, often small enough to be part of a microchip. The inertial measurement unit (IMU) 572 in some example configurations includes an accelerometer, a gyroscope, and a magnetometer. The accelerometer senses the linear acceleration of the client device 401 (including the acceleration due to gravity) relative to three orthogonal axes (x, y, z). The gyroscope senses the angular velocity of the client device 401 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the client device 401 relative to magnetic north.

The IMU 572 may include or cooperate with a digital motion processor or programming that gathers the raw data from the components and compute a number of useful values about the position, orientation, and motion of the client device 401. For example, the acceleration data gathered from the accelerometer can be integrated to obtain the velocity relative to each axis (x, y, z); and integrated again to obtain the position of the client device 401 (in linear coordinates, x, y, and z). The angular velocity data from the gyroscope can be integrated to obtain the position of the client device 401 (in spherical coordinates). The programming for computing these useful values may be stored in on or more memory elements 540A, 540B, 540C and executed by the CPU 540 of the client device 401.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 540 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 540, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 540 or processor hardware in smartphone, laptop computer, and tablet.

The CPU 540 serves as a programmable host controller for the mobile device 401 by configuring the mobile device 401 to perform various operations, for example, in accordance with instructions or programming executable by CPU 540. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 540, e.g., as a working data processing memory. The flash memory 540A typically provides longer-term storage.

Hence, in the example of mobile device 401, the flash memory 540A is used to store programming or instructions for execution by the CPU 540. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device within the mapped environment, and determine a relative position of the eyewear device to one or more objects in the mapped environment. The processor 432 may construct the map and determine location and position information using a simultaneous localization and mapping (SLAM) algorithm applied to data received from one or more sensors. Sensor data includes images received from one or both of the cameras 114A, 114B, distance(s) received from a laser range finder, position information received from a GPS unit, motion and acceleration data received from an IMU 572, or a combination of data from such sensors, or from other sensors that provide data useful in determining positional information. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection. In a system that includes a high-definition (HD) video camera that captures video at a high frame rate (e.g., thirty frames per second), the SLAM algorithm updates the map and the location of objects at least as frequently as the frame rate; in other words, calculating and updating the mapping and localization thirty times per second.

Sensor data includes image(s) received from one or both cameras 114A, 114B, distance(s) received from a laser range finder, position information received from a GPS unit, motion and acceleration data received from an IMU 472, or a combination of data from such sensors, or from other sensors that provide data useful in determining positional information.

Figure 6:
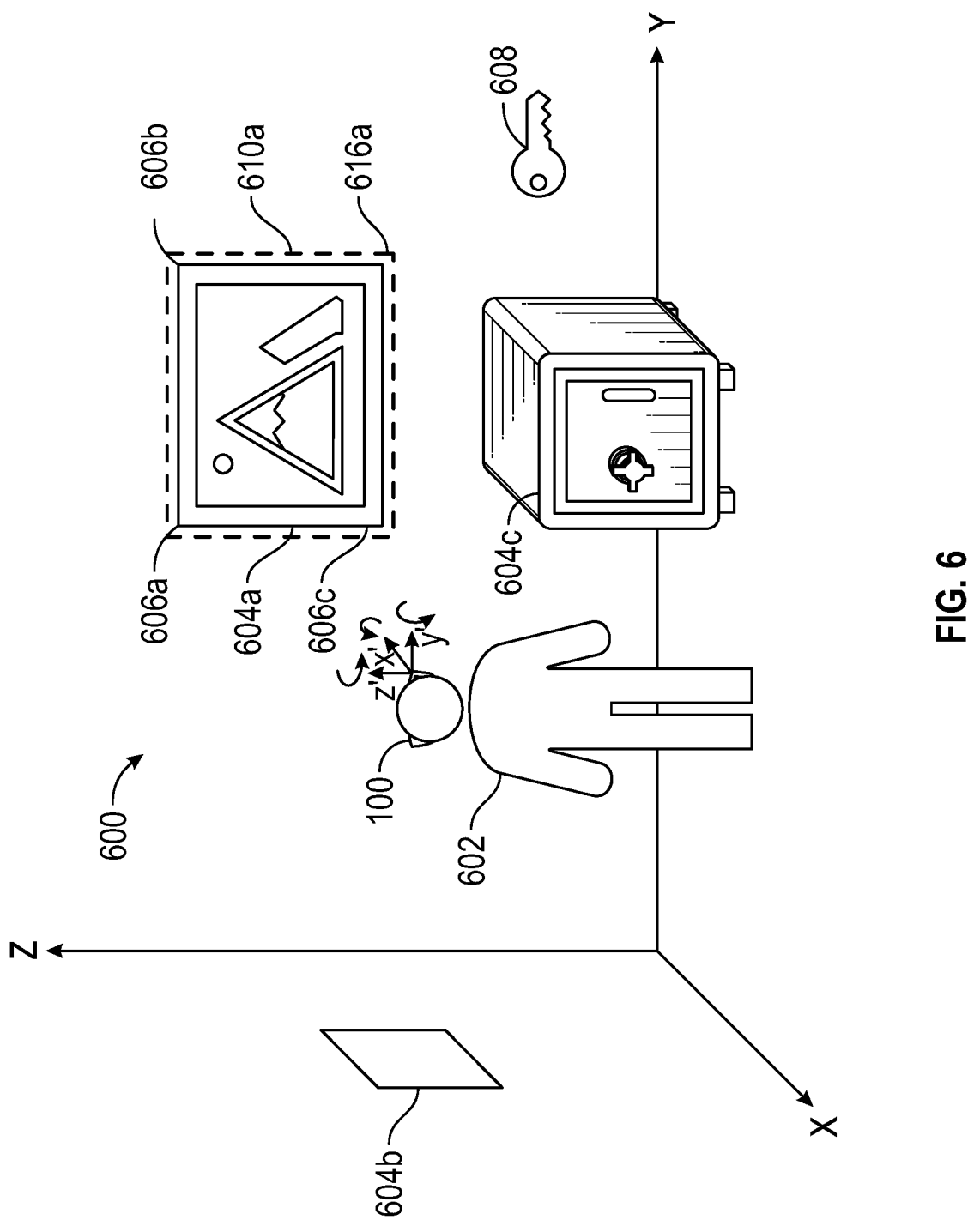
FIG. 6 is a schematic illustration of a user in an example environment for use in describing simultaneous localization and mapping.

FIG. 6 depicts an example physical environment 600 along with elements that are useful when using a SLAM application and other types of tracking applications (e.g., natural feature tracking (NFT)). A user 602 of eyewear device 100 is present in an example physical environment 600 (which, in FIG. 6, is an interior room). The processor 432 of the eyewear device 100 determines its position with respect to one or more objects 604 within the environment 600 using captured images, constructs a map of the environment 600 using a coordinate system (x, y, z) for the environment 600, and determines its position within the coordinate system. Additionally, the processor 432 determines a head pose (roll, pitch, and yaw) of the eyewear device 100 within the environment by using two or more location points (e.g., three location points 606a, 606b, and 606c) associated with a single object 604a, or by using one or more location points 606 associated with two or more objects 604a, 604b, 604c. The processor 432 of the eyewear device 100 may position a virtual object 608 (such as the key shown in FIG. 6) within the environment 600 for viewing during an augmented reality experience.

The localization system 915 in some examples a virtual marker 610a associated with a virtual object 608 in the environment 600. In augmented reality, markers are registered at locations in the environment to assist devices with the task of tracking and updating the location of users, devices, and objects (virtual and physical) in a mapped environment. Markers are sometimes registered to a high-contrast physical object, such as the relatively dark object, such as the framed picture 604a, mounted on a lighter-colored wall, to assist cameras and other sensors with the task of detecting the marker. The markers may be preassigned or may be assigned by the eyewear device 100 upon entering the environment.

Markers can be encoded with or otherwise linked to information. A marker might include position information, a physical code (such as a bar code or a QR code; either visible to the user or hidden), or a combination thereof. A set of data associated with the marker is stored in the memory 434 of the eyewear device 100. The set of data includes information about the marker 610a, the marker's position (location and orientation), one or more virtual objects, or a combination thereof. The marker position may include three-dimensional coordinates for one or more marker landmarks 616a, such as the corner of the generally rectangular marker 610a shown in FIG. 6. The marker location may be expressed relative to real-world geographic coordinates, a system of marker coordinates, a position of the eyewear device 100, or other coordinate system. The one or more virtual objects associated with the marker 610a may include any of a variety of material, including still images, video, audio, tactile feedback, executable applications, interactive user interfaces and experiences, and combinations or sequences of such material. Any type of content capable of being stored in a memory and retrieved when the marker 610a is encountered or associated with an assigned marker may be classified as a virtual object in this context. The key 608 shown in FIG. 6, for example, is a virtual object displayed as a still image, either 2D or 3D, at a marker location.

In one example, the marker 610a may be registered in memory as being located near and associated with a physical object 604a (e.g., the framed work of art shown in FIG. 6). In another example, the marker may be registered in memory as being a particular position with respect to the eyewear device 100.

Figure 9:
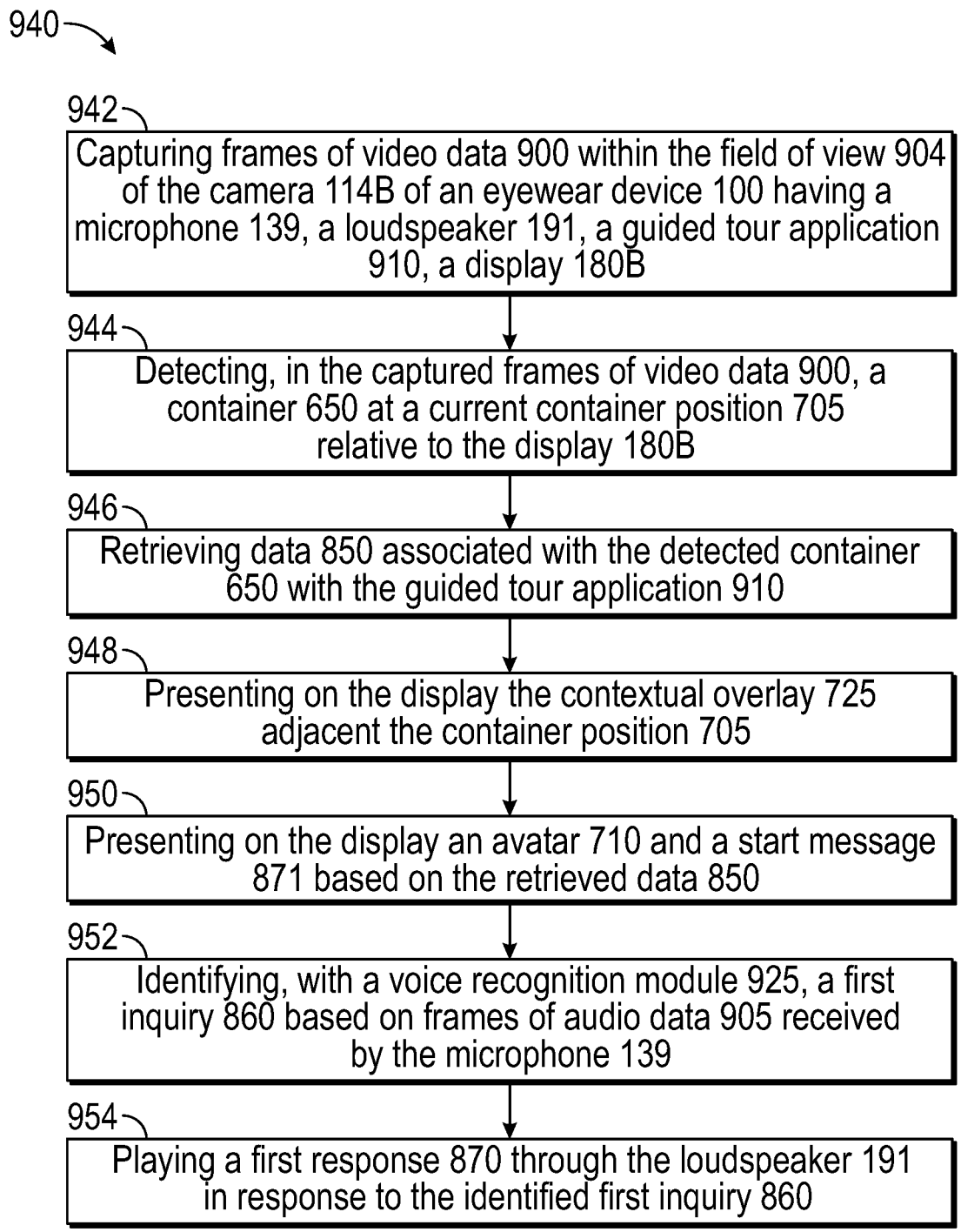
FIG. 9 is a flow chart listing the steps in an example method of presenting a virtual guided tour experience on a display.

FIG. 9 is a flow chart 940 listing the steps in an example method of presenting a virtual tour experience 700 on the display 180B of an eyewear device 100. Although the steps are described with reference to the eyewear device 100 described herein, other implementations of the steps described, for other types of devices, will be understood by one of skill in the art from the description herein. One or more of the steps shown and described may be performed simultaneously, in a series, in an order other than shown and described, or in conjunction with additional steps. Some steps may be omitted or, in some applications, repeated.

The guided tour application 910 described herein, in some implementations, starts in response to receiving a selection through a user interface (e.g., selecting from a menu, pressing a button) or through some other input means (e.g., hand gesture, voice command). In other examples, the guided tour application 910 starts in response to detecting a container 650, as described herein.

Figure 7:
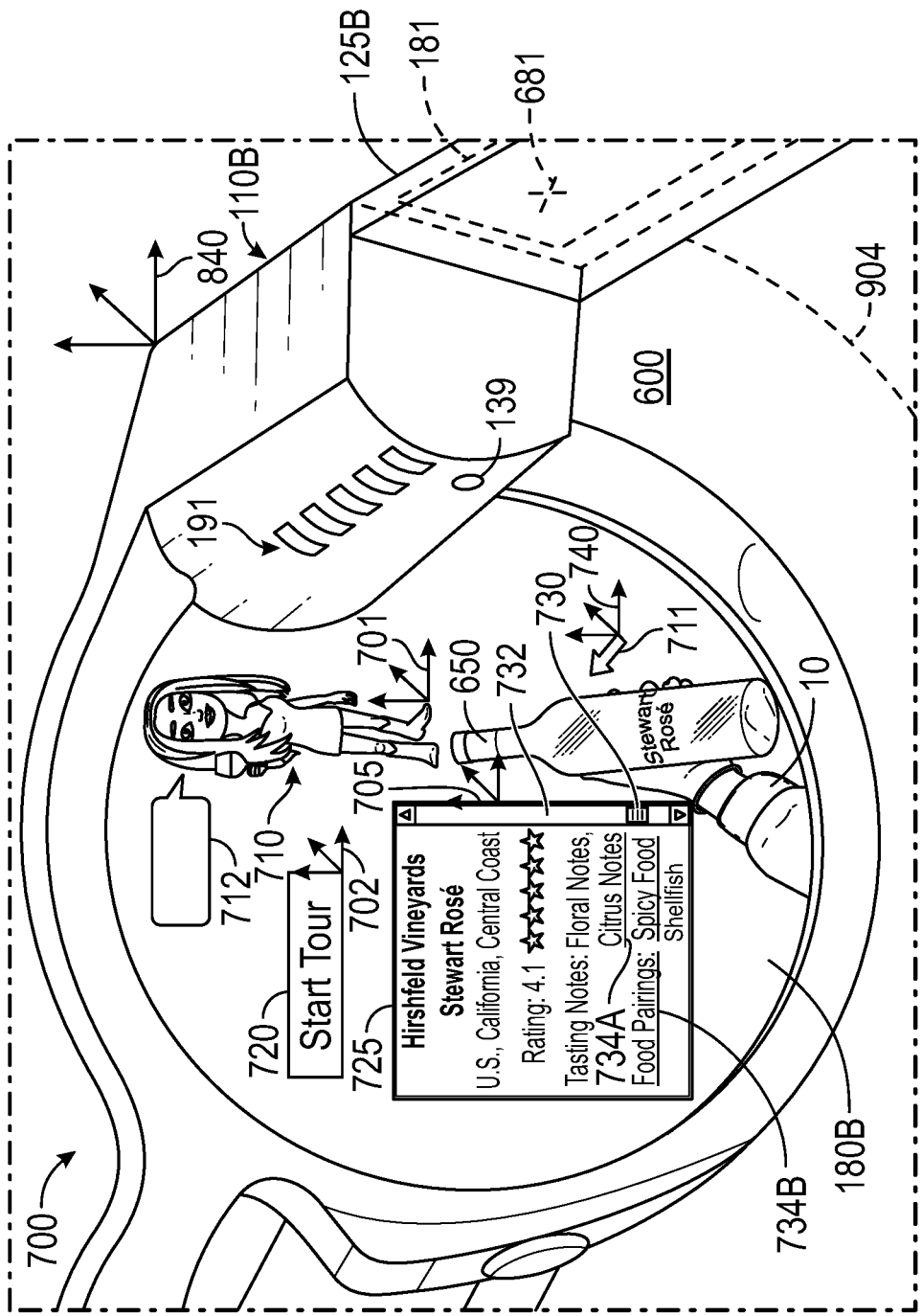
FIG. 7 is a perspective illustration of an example avatar and a contextual overlay on a display.
Figure 8:
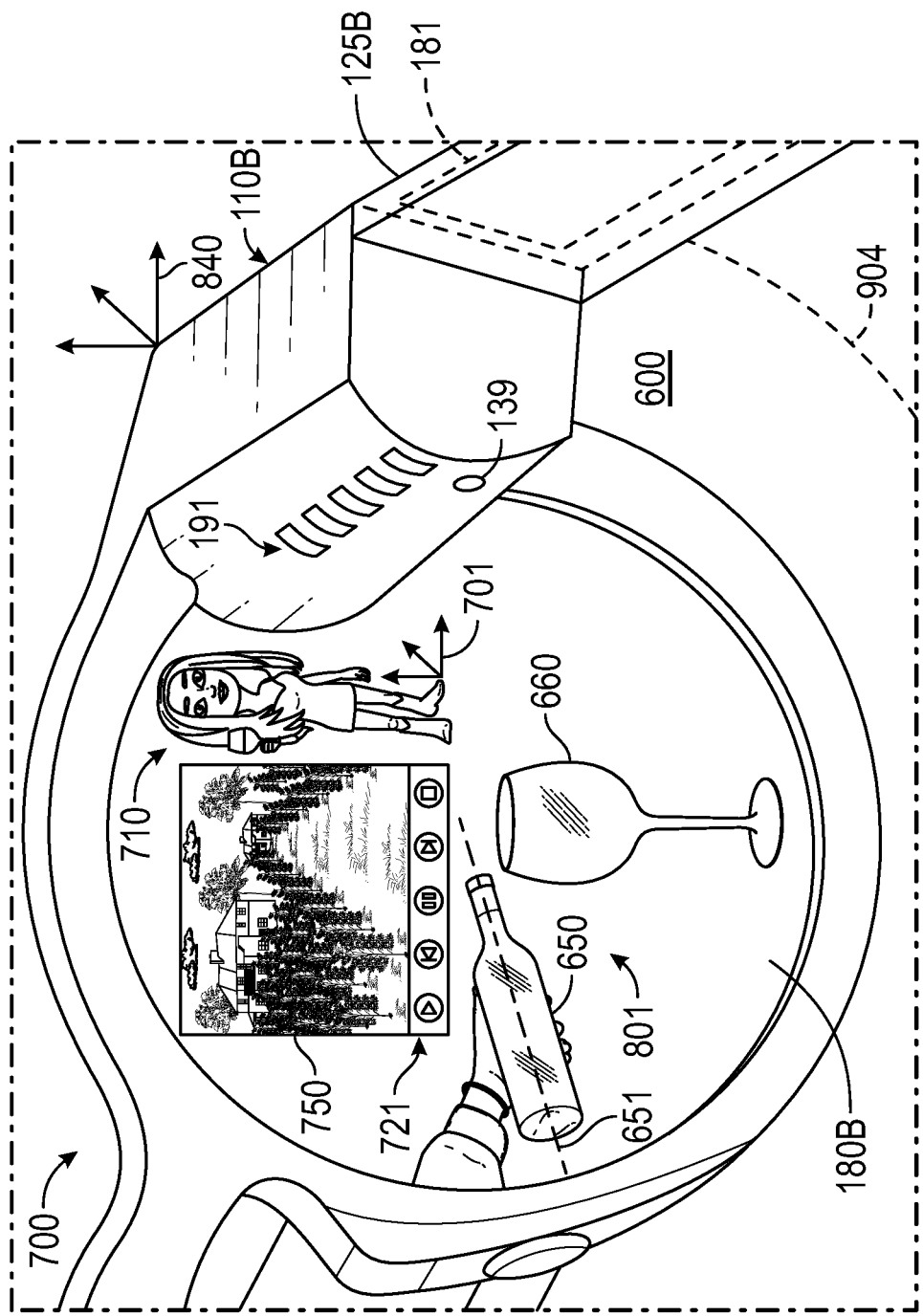
FIG. 8 is a perspective illustration of an example an avatar presenting a virtual guided tour on a display.

Block 942 in FIG. 9 describes an example step of capturing frames a video data 900 within the field of view 904 of the camera 114B of an eyewear device 100. The eyewear device 100 in this example includes a camera 114B, a microphone 139, a loudspeaker 191, a guided tour application 910, and a display 180B. In some implementations, the eyewear device 100 includes one or more cameras 114A, 114B, as described herein, for capturing either still images or frames of video data 900. The eyewear device 100 in this example includes an image processing system 920 and one or more displays 180A, 180B. For example, as shown in FIG. 7 and FIG. 8, the eyewear device 100 includes a semi-transparent image display 180B which, as described herein, may include a semi-transparent lens layer and a display matrix layer configured to present images on the lens of the eyewear device. Graphical and virtual elements are part of a contextual overlay 725, which is presented on the display 180B as an overlay relative the surrounding physical environment 600. The effect, as shown, allows the viewer to see and interact with the presented contextual overlay 725 while the surrounding environment 600 also remains visible through the display 180B.

In some implementations, the high-speed processor 432 of the eyewear device 100 stores the captured frames of video data 900 with a camera 114B as the wearer moves through a physical environment 600. As described herein and shown in FIG. 7, the camera 114B typically has a camera field of view 904 that may capture images and video of the environment beyond the limits of the display 180B.

The camera system, in some implementations, includes one or more high-resolution, digital cameras equipped with a CMOS image sensor capable of capturing high-definition still images and high-definition video at relatively high frame rates (e.g., thirty frames per second or more). Each frame of digital video includes depth information for a plurality of pixels in the image. In this aspect, the camera system serves as a high-definition scanner by capturing a detailed input image of the physical environment. The camera system, in some implementations, includes a pair of high-resolution digital cameras 114A, 114B coupled to the eyewear device 100 and spaced apart to acquire a left-camera raw image and a right-camera raw image, as described herein. When combined, the raw images form an input image that includes a matrix of three-dimensional pixel locations. The example method, at block 942, in some implementations, includes storing the captured frames of video data 900 in memory 434 on the eyewear device 100, at least temporarily, such that the frames are available for analysis.

The process of capturing frames of video data 900 described herein, in some implementations, is ongoing during active use of the eyewear device 100. In other examples, the process of capturing starts in response to receiving a selection through a user interface (e.g., selecting from a menu, pressing a button) or through some other input means (e.g., hand gesture, voice command).

Block 944 describes an example step of detecting a container 650 in the captured frames of video data 900 with the image processing system 920. The process of detecting a container 650 includes detecting a current container position 705 in three-dimensional coordinates relative to the display 180B or, alternatively, relative to another known position, such as the eyewear location 840. In some example implementations, the image processing system 920 analyzes the pixel-level data in the captured frames of video data 900 to determine whether the frame includes one or more containers 650.

FIG. 7 is a perspective illustration of an example container 650 held by a hand 10 in a physical environment 600. In this example, the guided tour application 910 detects and sets the current container position 705 near the side of the detected container 650, as shown. In other contexts, the container position 705 may be set near the center of a detected container 650, or at some other predefined or configurable position relative to the size and shape of the detected container 650.

As used herein, the term container 650 refers to and includes closed containers such as bottles, cans, jars, and flasks; open vessels such as jugs, pitchers, decanters, carafes, cups, mugs, tanks, vats, and baskets; and other receptacles for holding items, including but not limited to bowls, plates, dishes, spoons, bags, pouches, and human hands.

Those skilled in the art will understand that the process of detecting containers 650 and container positions 705 occurs continually, over time, as the eyewear device 100 moves through the physical environment 600. Over time, additional containers 650 may be detected within the field of view 904 of the camera 114B while others cease to be detected. Moreover, one or more detected containers 650 may be moved to a new location in the physical environment 600 and then detected at a different or updated current container position 705. In this aspect, the process of detecting is ongoing and substantially continuous, in which the image processing system 920 analyzes the pixel-level data in the captured frames of video data 900 to detect subsequent containers at subsequent container positions.

The example process at block 944 includes determining whether the captured frames of video data 900 include a container 650. In some implementations, the image processing system 920 compares the pixel-level data in the captured frames of video data 900 to the data that is stored in the object data library 482 about each of a plurality of predefined containers and other objects. For example, the data record about an object includes a name or other identifier (e.g., bottle, can, bicycle, person, mug, wine glass), a shape and size including three-dimensional coordinates for one or more object landmarks, a point of view (e.g., side, top, bottom), a directional reference (e.g., vertical, horizontal), and other data and descriptors related to each object.

The example process at block 944 includes of course detecting two or more containers in the captured frames of video data 900. In this aspect, over time, the process includes detecting a subsequent container, retrieving data associated with the detected subsequent container, presenting a subsequent contextual overlay and a subsequent start message based on the subsequent retrieved data.

Block 946 in FIG. 9 describes an example step of retrieving data 850 associated with the detected container 650 with the guided tour application 910. The retrieved data 850 is stored in memory 434 on the eyewear device 100, at least temporarily. In some example implementations, as described at block 946 of FIG. 9, the process of retrieving data 850 includes gathering information about the detected container 650 and its contents from one or more sources, including the object data library 482 or the tour library 484, and may further include one or more websites on the internet. In this aspect, the process of retrieving data 850 includes assembling search terms, executing a search, and harvesting information relevant to the detected container 650 and its contents. The guided tour application 910, in some implementations, is configured to access one or more preferred search engines, websites, and other internet-based resources. In some implementations, the process at block 946 of retrieving data 850 using an internet search involves using a machine-learning algorithm to select the search engine, web resources, and website data most likely to retrieve relevant container information quickly and efficiently.

Block 948 in FIG. 9 describes an example step of presenting a contextual overlay 725 on the display 180B. The contextual overlay 725 is based on the data 850 retrieved about the detected container 650. The contextual overlay 725 is presented at a position that is adjacent or otherwise associated with the detected container position 705, as shown in FIG. 7. In some implementations, the contextual overlay 725 is rendered in size and shape according to its contents, up to a configurable maximum size that will fit on the display 180B. In other implementations, the contents of the contextual overlay 725 are limited in size according to the size and shape of the contextual overlay 725.

As the eyewear device 100 moves through the physical environment 600, in some implementations, the contextual overlay 725 will appear to remain near the current container position 705 using a process called localization. The localization system 915 on the eyewear device 100 in some implementations configures the processor 432 on the eyewear 100 to obtain localization data for use in determining the current eyewear location 840 relative to the current container position 705. The localization data may be derived from the captured frames of video data 900, an IMU unit 472, a GPS unit, or a combination thereof. The localization system 915 may construct a virtual map of various elements within the camera field of view 904 using a SLAM algorithm, as described herein, updating the map and the location of objects at least as frequently as the frame rate of the camera 114B (e.g., calculating and updating the mapping and localization of the current eyewear location 840 as frequently as thirty times per second, or more).

The process of localization in some implementations includes calculating a correlation between the detected container position 705 and the current eyewear location 840. The term correlation refers to and includes one or more vectors, matrices, formulas, or other mathematical expressions sufficient to define the three-dimensional distance between the detected container position 705 and the eyewear display 180B, in accordance with the current eyewear location 840. The current eyewear location 840, of course, is tied to or persistently associated with the display 180B which is supported by the frame of the eyewear device 100. In this aspect, the correlation performs the function of calibrating the motion of the eyewear 100 with the apparent motion of the detected container 650. Because the localization process occurs continually and frequently, the correlation is calculated continually and frequently, resulting in accurate and near real-time tracking of the detected current container position 705 relative to the current eyewear location 840.

Because the localization process occurs continually and frequently, the correlation is calculated continually and frequently, resulting in accurate and near real-time tracking of the current location of the container 650 relative to the current eyewear location 840.

The contextual overlay 725 is based on the retrieved data 850 retrieved about the detected container 650 and its contents. According to one example, in which the container 650 is a bottle of wine, the contextual overlay 725 shown in FIG. 7 includes the name of the wine, the winemaker, and the region where the wine was produced. The contextual overlay 725 as shown also includes a rating, tasting notes, and food pairing recommendations.

The contextual overlay 725 in some implementations includes one or more interactive graphical elements 730, each of which is associated with additional content 726. For example, as shown in FIG. 7, the contextual overlay 725 includes a slider element 730 and a scroll bar 732. For example, using the scroll bar 732 may reveal additional content 726, including additional or different features, ratings, notes, and information. Using the interactive graphical elements 730, in some implementations, will reveal an alternative (e.g., a similar wine) to the contents associated with detected container 650. Also, one or more textual elements of the contextual overlay 725 is underlined indicating a clickable link to be followed. For example, a first link 734A associated with Citrus Notes, when selected, reveals additional detail about the tastes, flavors, and other characteristics of the contents of the container 650. A second link 734B associated with Food Pairings, when selected, reveals additional detail about the recommended foods that pair well with the contents of the container 650. The links, when selected, may cause all or part of the contextual overlay 725 to be replaced or updated with new and different content. Any of a variety of other graphical elements 730 may be included in the contextual overlay 725. As used herein, one or more interactive elements 730 means and includes any collection of graphical elements presented on a display, including but not limited to virtual objects associated with VR experiences and graphical elements such as icons, thumbnails, taskbars, and menu items.

The interactive graphical elements 730, in some implementations, includes a movable element 711 (e.g., a cursor, as shown in FIG. 7) presented at a current element position 740 relative to the display. Interacting with the cursor 711, in some implementations, includes detecting a current fingertip location 681 relative to a touchpad 181 coupled to the eyewear device, as shown; and then presenting the cursor 711 at a current element position 740 on the display in accordance with the detected current fingertip location 681. In this example, a navigating action can be executed by moving the cursor 711 to one of the graphical elements on the display. For example, the navigating action includes placing the cursor 711 near the scroll bar 732, near one of the links 734A, 734B, or near a selectable graphical element 720, and tapping, pressing, double-tapping, or otherwise selecting the nearby element.

As shown in FIG. 7, the virtual tour experience 700 in some implementations includes a selectable graphical element 720 (e.g., a Start Tour button). The selectable graphical element 720 is presented on the display at a button position 702 relative to the display. In some implementations, the button position 702 is defined in relation to the display 180B, such that the selectable graphical element 720 will be presented at a consistent position on the display (e.g., in the upper left corner). In some implementations, detecting a selecting action (e.g., placing the cursor 711 near the element 720 and tapping) causes the guided tour application 910 to start presenting the virtual tour experience 700. The selecting action, in some implementations, includes receiving a voice command to start the tour.

Block 950 in FIG. 9 describes an example step of presenting an avatar 710 on the display at an avatar position 701 relative to the display. The avatar 710 is based on the data 850 retrieved about the detected container 650 and its contents. According to one example, in which the container 650 is a bottle of wine, the avatar 710 shown in FIG. 7 appears to be holding a glass of wine.

The avatar 710 is presented on the display at an avatar position 701 relative to the display. In some implementations, the avatar position 701 is defined in relation to the display 180B, such that the avatar 710 will be presented at a consistent position on the display (e.g., in the upper right corner).

Block 950 in FIG. 9 also describes an example step of presenting a start message 871 that is based on the data 850 retrieved about the detected container 650 and its contents. According to one example, in which the container 650 is a bottle of wine, the start message 871 may include an avatar name (e.g., "Megan the Sommelier"), a welcome (e.g., "Great choice! Cheers!") and a note about one or more elements of the contextual overlay 725 (e.g., "This wine pairs well with shellfish" or "Hirshfeld Vineyards was voted best vintner of 2024").

The start message 871, as well as other messages and responses described herein, may be presented in text form (e.g., inside a speech bubble 712 adjacent the avatar 710, as shown in FIG. 7, or anywhere on the display) or played audibly through the loudspeaker 191, or both. In some implementations, playing a message or response includes animating the avatar 710 so that the avatar 710 appears to be speaking the message or the response.

In some implementations, the speech bubble 712 is rendered in size according to the content of the message or response, up to a configurable maximum size that will fit on the display 180B. In other implementations, the length of message or response is limited in size according to the size and shape of the speech bubble 712. In this aspect, any message or response described herein may be presented sequentially, in segments.

Block 952 in FIG. 9 describes an example step of identifying, with a voice recognition module 925, a first inquiry 860 based on frames of audio data 905 received by a microphone 139. The voice recognition module 925 is coupled to or otherwise accessible by the eyewear device 100. The process of identifying the first inquiry 860 includes receiving human speech through a microphone 139 and then converting the speech into frames of audio data 905. The voice recognition module 925 analyzes the frames of audio data 905, using automated speech recognition processing, to identify the contents of the first inquiry 860. In some implementations, the automated speech recognition involves using a machine-learning algorithm that has been trained to detect, decipher, and identify the contents of human speech quickly and efficiently.

Block 954 describes an example step of playing a first response 870 in response to the identified first inquiry 860. Like other messages and responses described herein, the first response 870 may be presented in text form (e.g., inside a speech bubble 712) or played audibly through the loudspeaker 191, or both. The process of assembling and playing the first response 870 by the voice recognition module 925 includes correlating the contents of the first response 870 with the contents of the first inquiry 860.

Blocks 952 and 954 in FIG. 9 describe an example process for conducting an interactive question-and-answer session with the avatar 710 in which the guided tour application 910 provides responses that are correlated with and responsive to inquiries. This kind of voice-based interactive session, in some implementations, is active and available at any time during the virtual tour experience 700 described herein.

Figure 10:
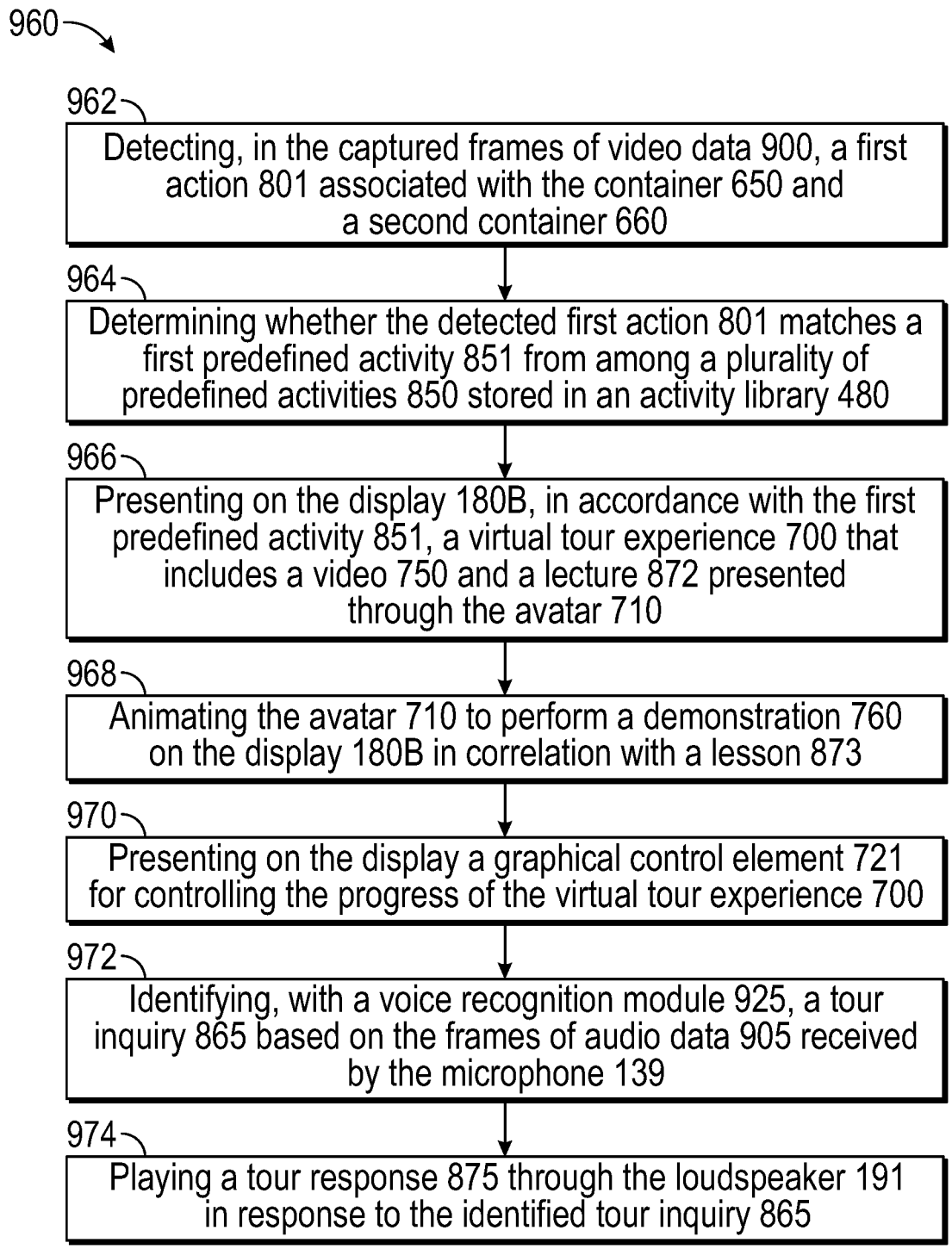
FIG. 10 is a flow chart listing the steps in an example method of presenting a virtual guided tour experience in response to detecting an action on the display.

FIG. 10 is a flow chart 960 listing the steps in an example method of presenting a virtual guided tour experience 700 in response to detecting an action on the display.

Block 962 in FIG. 10 describes an example step of detecting a first action 801 in the captured frames of video data 900 with the image processing system 920. In an example implementation, the first action 801 is associated with the detected container 650 and a second container 660. In this aspect, the detecting process includes detecting the second container 660 in the captured frames of video data 900.

FIG. 8 is a perspective illustration of an example container 650 (e.g., a wine bottle) having a central axis 651 and a second container 660 (e.g., a wine glass). The first action 801 illustrated in FIG. 8 includes pouring the contents of the container 650 into the second container 660. The process of detecting the first action 801 includes comparing the central axis 651 of the bottle container 650 with the orientation of the second container 660. In this example, the first action 801 of pouring the wine starts the virtual guided tour experience 700

Block 964 in FIG. 10 describes the example step of determining whether the detected first action 801 matches a first predefined activity 851 (e.g., pouring contents into a second container) from among a plurality of predefined activities 850 stored in the activity library 480. Any of a variety of predefined activities 850 may be established, defined, and stored in the activity library 480.

In the example shown in FIG. 8, the image processing system 920 analyzes the pixel-level data in the captured frames of video data 900 to determine whether the container 650 is performing a first action 801 relative to the second container 660 (e.g., pouring) in a manner that matches the first predefined activity 851 as defined and stored in the activity library 480. In some example implementations, the data record about a predefined activity includes a name or other identifier (e.g., opening, pouring, sipping), a series of shapes representing a container in motion, including three-dimensional coordinates for one or more container landmarks, a point of view (e.g., side, top, bottom), a directional reference (e.g., vertical, horizontal), and other data and descriptors related to each activity.

In some implementations, the guided tour application 700 is configured to detect one or more other actions, each of which may be paired with a corresponding predefined activity, as stored in the activity library 480. For example, the application 700 may be configured to detect an opening action (e.g., removing the cork, bottle, stopper, or other lid from the container 650). In certain contexts, such as wine and certain liquors, the opening of the container 650 may be associated with one or more related activities (e.g., allowing the wine to breathe for a predefined duration). A corresponding predefined opening activity may be defined and stored in the activity library 480.

In another example, the application 700 may be configured to detect a tasting action (e.g., consuming the contents of the container 650 or second container 660). A corresponding predefined tasting activity (e.g., characterized by bringing the container 650 or second container 660 within a predefined threshold distance of the mouth) may be defined and stored in the activity library 480.

Block 966 in FIG. 10 describes the example step of presenting the virtual guided tour experience 700 on the display in response to detecting a match between the detected first action 801 and the first predefined activity 851.

The virtual guided tour experience 700 in some implementations includes a video 750 presented on the display, as shown in FIG. 8, at a position that is adjacent or otherwise associated with the avatar position 701. The video 750 is presented in correlation with a lecture 872, such that the lecture 872 corresponds in time with the content of the video 750. The lecture 872 is presented through the avatar 710. Like other messages and responses, the lecture 872 may be presented in text form (e.g., inside a speech bubble 712 adjacent the avatar 710 or anywhere on the display) or played audibly through the loudspeaker 191, or both. In some implementations, playing the lecture 872 includes animating the avatar 710, using the avatar animation engine 930 described herein, so that the avatar 710 appears to be speaking the contents of the lecture 872.

The lecture 872 includes any of a variety of topics related to the container 650, its contents, the retrieved data 850, and any other elements described herein. In the context of traditionally crafted wine, beer, liquor, cider, tea, coffee, chocolate, produce, nuts, cheeses, and other products. The lecture 872 may include the general topics of farming, horticulture, farm management, soil preparation and preservation, harvesting, storage, mixing and blending, carbonation, flavors and additives, preservatives, aging, bottling, labeling, packaging, marketing, selling, pairings of foods and beverages, serving methods and recommendations, history, tasting procedures and protocols, and tour experiences. The avatar 710 may be presented as a craftsman, a farmer, an historian, a business owner, a laboratory technician, a trained guide, or another person familiar with the particular product or operation.

According to one example in which the container 650 is a bottle of wine, the lecture 872 may include topics such as wine, viticulture, winemaking, vinification, oenology, pigéage, pressing, fermentation, tannins, corking, and bottling. The avatar 710 in this example may be presented as a sommelier, a chef, a vineyard owner, or an experienced wine maker.

In the context of beer, the lecture 872 may include beer, brewing, grains and grain harvesting, hops, steeping, mashing, malting, lautering, sparging, capping, and bottling. The avatar 710 in this example may be presented as a master brewer, a brewery owner, or a trained guide.

In the context of liquor and distilled spirits, the lecture 872 may include liquor, grains and grain harvesting, distillation, fermentation, filtration, aging, and bottling. The avatar 710 in this example may be presented as a master distiller, a distillery owner, or a trained guide.

In the context of cider, the lecture 872 may include cider, cider-making, orchards, fruit harvesting, pressing, mashing, fermentation, and bottling. The avatar 710 in this example may be presented as a cider maker, an orchard manager, a cidery owner, or a trained guide.

In the context of tea, the lecture 872 may include tea, tea growing, plantation management, tea blending and additives, bagging, steeping and ceremonies. The avatar 710 in this example may be presented as a tea specialist, a tea plantation owner, or a trained guide.

In the context of coffee, the lecture 872 may include coffee, coffee bean growing, plantation management, bean grading, roasting, blending, brewing, and preparation methods. The avatar 710 in this example may be presented as a barista, a coffee specialist, a plantation owner, or a trained guide.

Block 968 in FIG. 10 describes the example step of animating the avatar 710 to perform a demonstration 760 on the display in correlation with a lesson 873. The demonstration 760, in some implementations, includes showing one or more ways to pour and serve the contents of the container 650 (e.g., a preferred manner of pouring or decanting the contents into the second container 660), one or more ways to taste the contents (e.g., swirling the contents), and any of a variety of other example or preferred methods of accomplishing a task related to the container 650 or its contents. In some implementations, the avatar animation engine 930 renders and presents the avatar 710 on the display in various postures (e.g., holding, pouring, swirling) and with various props (e.g., decanters, wine glasses, mugs) to perform a demonstration 760. The lesson 873 refers to and includes a speech directly correlated with the demonstration 760, which may or may not be part of the lecture 872.

Block 970 in FIG. 10 describes the example step of presenting a graphical control element 721 on the display for controlling the progress of the virtual guided tour experience 700. The graphical control element 721 may be presented on the display at a position that is related or adjacent to the avatar position 702, at a position near the video 750, or at another selected position.

The graphical control element 721 may be configured to control the progress of the video 750. For example, as shown in FIG. 8, the example graphical control element 721 includes selectable buttons for play, go back, pause, skip forward, and stop. The components of graphical control element 721 may be selected using the touchpad 181 and the cursor 711, as described herein.

In some implementations, the graphical control element 721 is configured to go back (and repeat portions) or skip forward (omit portions) of the virtual guided tour experience 700. For example, the virtual guided tour experience 700 may start with a tour of a farm or a harvest; the control element 721 may be used to skip forward to a tour of the factory or other facilities.

Additional or different graphical control elements 721 may be presented on the display and configured to perform other activities, such as record, save, share with a friend, delete, and any of a variety of other activities suitable for handling or processing an experience.

Blocks 972 and 974 in FIG. 10 describe an example process for conducting an interactive question-and-answer session with the avatar 710 during the lecture 872 or the lesson 873. In some implementations, the tour 700 is automatically paused during such an interactive session.

Block 972 in FIG. 10 describes an example step of identifying, with a voice recognition module 925, a tour inquiry 865 (e.g., during the tour 700, during a demonstration 760). The voice recognition module 925 as described herein converts the speech into frames of audio data 905. The voice recognition module 925 analyzes the frames of audio data 905, using automated speech recognition processing, to identify the contents of the tour inquiry 865.

Block 974 describes an example step of playing a tour response 875 in response to the identified tour inquiry 865. Like other messages and responses described herein, the tour response 875 may be presented in text form (e.g., inside a speech bubble 712) or played audibly through the loudspeaker 191, or both. The process of assembling and playing the tour response 875 by the voice recognition module 925 includes correlating the contents of the tour response 875 with the contents of the tour inquiry 865.

Although the various systems and methods are described herein with reference to containers and beverages, such as wine, beer, liquor, or cider, the technology described may be applied to detecting any type of container or product in a physical environment, retrieving data about the detected product, and presenting a virtual guided tour on a display.

In some example implementations, the container 650 as described herein may include a selectively removable lid such as a cork, a screw-type cap, a bottle cap, or a stopper. The container 650 may hold any of a variety of products, including but not limited to wine, beer, liquor, or cider. The virtual tour experience 700 may be associated with one or more locales including but not limited to wineries, breweries, distilleries, and cider houses.

In some implementations, the virtual tour experience 700 includes a farm segment and a factory segment. The farm segment is associated with one or more farms including but not limited to vineyards, grain farms, hops farms, and orchards. The factory segment is associated with one or more rooms, spaces, or other areas, including but not limited to barns, harvest areas, pressing rooms, blending rooms, laboratories, fermentation rooms, distillation rooms, cider houses, kettle rooms, barrel room, cask rooms and cellars, bottling facilities, warehouses, retail shops, and tasting areas.

Several of the processes described herein, in some implementations, involve the use of computer vision systems and machine-learning algorithms which are trained to analyze the pixel-level information contained in captured frames of video data 900. Machine-trained object-classification algorithms are used to identify objects detected in frames of video data 900 and, as the name implies, classify the objects as belonging to one or more discrete classes (e.g., containers, bottles, cups, mugs, furniture). For example, classification algorithms may be used to facilitate the process of detecting a container 650 (as well as subsequent containers), detecting a navigating action, a selecting action, or other actions.

Similarly, the processes of matching detected actions with one or more predefined activities, as described herein, in some implementations, involve the use of machine-trained algorithms for comparing the captured video data 900 to a plurality of predefined activities, with the goal of finding a match.

As used herein, the term match is meant to include substantial matches or near matches, which may be governed by a predetermined confidence value associated with possible or candidate matches. The detected item or action may include three-dimensional coordinates for various locations and landmarks, as found in the captured frames of video data 900. In some examples, the detecting and matching process includes calculating the sum of the geodesic distances between the detected item or action and a set of coordinates defined and stored for an item or object (as stored in the object data library 482) or for a predefined activity (as stored in the activity library 480). In this aspect, a sum that falls within a configurable threshold accuracy value represents a match.

Also, the voice recognition processes described herein, in some implementations, involve the use of computer-based speech recognition systems (including natural language understanding (NLU) techniques) and machine-learning algorithms which are trained to analyze human speech, convert the speech to audio data, and assemble responses in context.

Machine learning refers to an algorithm that improves incrementally through experience. By processing a large number of different input datasets (e.g., photographs of various objects, containers, and activities in various environments), a machine-learning algorithm can develop improved generalizations about particular datasets, and then use those generalizations to produce an accurate output or solution when processing a new dataset. Broadly speaking, a machine-learning algorithm includes one or more parameters that will adjust or change in response to new experiences, thereby improving the algorithm incrementally; a process similar to learning.

In the context of computer vision, mathematical models attempt to emulate the tasks accomplished by the human visual system, with the goal of using computers to extract information from an image and achieve an accurate understanding of the contents of the image. Computer vision algorithms have been developed for a variety of fields, including artificial intelligence and autonomous navigation, to extract and analyze data in digital images and video.

Deep learning refers to a class of machine-learning methods that are based on or modeled after artificial neural networks. An artificial neural network is a computing system made up of a number of simple, highly interconnected processing elements (nodes), which process information by their dynamic state response to external inputs. A large artificial neural network might have hundreds or thousands of nodes.

A convolutional neural network (CNN) is a type of neural network that is frequently applied to analyzing visual images, including digital photographs and video. The connectivity pattern between nodes in a CNN is typically modeled after the organization of the human visual cortex, which includes individual neurons arranged to respond to overlapping regions in a visual field. A neural network that is suitable for use in the determining process described herein is based on one of the following architectures: VGG16, VGG19, ResNet50, Inception V3, Xception, or other CNN-compatible architectures.

In one example implementation, a trained item classification model receives a frame of video data which contains a detected item and abstracts the image in the frame into layers for analysis. Data in each layer is compared to items and objects stored in the object data library 482, layer by layer, based on the trained classification model, until a good match is identified.

In one example, the layer-by-layer image analysis is executed using a convolutional neural network. In a first convolution layer, the CNN identifies learned features (e.g., wine bottle characteristics, wine labels, wine bottle descriptors, and the like). In a second convolution layer, the image is transformed into a plurality of images, in which the learned features are each accentuated in a respective sub-image. In a pooling layer, the sizes and resolution of the images and sub-images are reduced in order isolation portions of each image that include a possible feature of interest (e.g., a container, a vessel). The values and comparisons of images from the non-output layers are used to classify the image in the frame.

Any of the functionality described herein for the eyewear device 100, the mobile device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating system. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of presenting a virtual tour experience with an eyewear device, the eyewear device comprising a camera, a microphone, a loudspeaker, a guided tour application, an image processing system, and a display, the method comprising:

capturing frames of video data within a field of view of the camera;

detecting, in the captured frames of video data, with the image processing system, a container at a current container position relative to the display;

retrieving data associated with the detected container;

presenting, based on the retrieved data, a contextual overlay adjacent the current container position on the display;

presenting an avatar at an avatar position relative to the display; and playing, through the avatar, a start message based on the retrieved data;

detecting, in the captured frames of video data, a first action associated with the container and a second container:

determining whether the detected first action matches a first predefined activity from among a plurality of predefined activities stored in an activity library;

presenting on the display a virtual tour experience in accordance with the first predefined activity, comprising presenting a video on the display adjacent the avatar position and in correlation with a lecture presented through the avatar;

detecting a subsequent action;

determining whether the detected subsequent action matches a subsequent predefined activity from among a plurality of predefined activities; and presenting on the display a subsequent virtual tour experience in accordance with the subsequent predefined activity.

2. The method of claim 1, further comprising:

detecting a subsequent container at a subsequent current container position;

retrieving data associated with the detected subsequent container;

presenting a subsequent contextual overlay based on the subsequent retrieved data; and playing a subsequent start message based on the subsequent retrieved data.

3. The method of claim 1, wherein the process of presenting a contextual overlay further comprises:
presenting one or more interactive elements each associated with additional content;
detecting a current fingertip location relative to a touchpad coupled to the eyewear device;
presenting a movable element at a current element position on the display in accordance with the detected current fingertip location;
detecting, in the captured frames of video data, a navigating action relative to a first interactive element positioned on the display nearest the current element position; and
presenting the additional content on the display in response to the detected navigating action.

4. The method of claim 1, wherein the eyewear device further comprising a voice recognition module, and wherein the method further comprises:
receiving human speech with the microphone;
converting the received speech into frames of audio data;
identifying, with the voice recognition module, a first inquiry based on the frames of audio data; and
playing a first response through the loudspeaker in response to the identified first inquiry.

5. The method of claim 1, further comprising:
presenting a selectable graphical element on the display at a button position;
detecting a selecting action associated with the graphical element; and
presenting on the display the virtual tour experience in accordance with the detected selecting action.

6. The method of claim 1, further comprising:
animating the avatar to perform a demonstration on the display adjacent the avatar position in correlation with a lesson.

7. The method of claim 1, further comprising:
presenting on the display a graphical control element comprising one or more controls selected from the group consisting of play, pause, back, next, and stop; and
controlling progress of the virtual tour experience in accordance with the graphic control element.

8. A method of presenting a virtual tour experience with an eyewear device, the eyewear device comprising a camera, a microphone, a loudspeaker, a guided tour application, an image processing system, and a display, the method comprising:
capturing frames of video data within a field of view of the camera;
detecting, in the captured frames of video data, with the image processing system, a container at a current container position relative to the display;
retrieving data associated with the detected container;
presenting, based on the retrieved data, a contextual overlay adjacent the current container position on the display:
presenting an avatar at an avatar position relative to the display;
playing, through the avatar, a start message based on the retrieved data; and
presenting on the display a virtual tour experience comprising presenting a video in correlation with a lecture presented through the avatar,
wherein the container comprises a selectively removable lid and holds a product selected from the group consisting of wine, beer, liquor, and cider,
wherein the virtual tour experience is associated with a locale selected from the group consisting of a winery, a brewery, a distillery, and a cidery,
wherein the virtual tour experience comprises a farm segment and a factory segment,
wherein the farm segment is associated with a farm selected from the group consisting of a vineyard, a barley farm, a hops farm, a grain farm, and an orchard, and
wherein the factory segment is associated with a room selected from the group consisting of a barn, a harvest area, a pressing room, a blending room, a laboratory, a fermentation room, a distillation room, a cider house, a kettle room, a barrel room, a cask room, a bottling room, a tasting area, and a retail shop.

9. A virtual guided tour system, comprising:
an eyewear device comprising a camera, a microphone, a loudspeaker, a guided tour application, an image processing system, a memory, a processor, and a display; and
programming in the memory, wherein execution of the programming by the processor configures the eyewear device to perform functions, including functions to:
capture frames of video data within a field of view of the camera;
detect, in the captured frames of video data, with the image processing system, a container at a current container position relative to the display;
retrieve data associated with the detected container;
present, based on the retrieved data, a contextual overlay adjacent the current container position on the display;
present an avatar at an avatar position relative to the display;
play, through the avatar, a start message based on the retrieved data;
detect, in the captured frames of video data, a first action associated with the container and a second container;
determine whether the detected first action matches a first predefined activity from among a plurality of predefined activities stored in an activity library; and
present on the display a virtual tour experience in accordance with the first predefined activity, wherein the virtual tour experience comprises a video presented on the display adjacent the avatar position and in correlation with a lecture presented through the avatar.

10. The virtual guided tour system of claim 9, wherein the function to present a contextual overlay further comprises functions to:
present one or more interactive elements each associated with additional content;
detect a current fingertip location relative to a touchpad coupled to the eyewear device;
present a movable element at a current element position on the display in accordance with the detected current fingertip location;
detect, in the captured frames of video data, a navigating action relative to a first interactive element positioned on the display nearest the current element position; and
present the additional content on the display in response to the detected navigating action.

11. The virtual guided tour system of claim 9, wherein the eyewear device further comprises a voice recognition module, and wherein the execution of the programing further configures the eyewear device to perform functions to:
receive human speech with the microphone;
convert the received speech into frames of audio data;
identify, with the voice recognition module, a first inquiry based on the frames of audio data; and
play a first response through the loudspeaker in response to the identified first inquiry.

12. The virtual guided tour system of claim 9, wherein execution of the programming by the processor further configures the eyewear device to perform additional functions, including functions to:
detect a subsequent container at a subsequent current container position;
retrieve data associated with the detected subsequent container;
present a subsequent contextual overlay based on the subsequent retrieved data; and
play a subsequent start message based on the subsequent retrieved data.

13. The virtual guided tour system of claim 9, wherein the execution of the programming further configures the eyewear device to perform functions to:
animate the avatar to perform a demonstration on the display adjacent the avatar position in correlation with a lesson.

14. A non-transitory computer-readable medium storing program code which, when executed, is operative to cause an electronic processor to perform the steps of:
capturing frames of video data within a field of view of a camera of an eyewear device, the eyewear device further comprising a microphone, a loudspeaker, a guided tour application, an image processing system, and a display;
detecting, in the captured frames of video data, with the image processing system, a container at a current container position relative to the display;
retrieving data associated with the detected container;
presenting, based on the retrieved data, a contextual overlay adjacent the current container position on the display;
presenting an avatar at an avatar position relative to the display;
playing, through the avatar, a start message based on the retrieved data;
detecting, in the captured frames of video data, a first action associated with the container and a second container;
determining whether the detected first action matches a first predefined activity from among a plurality of predefined activities stored in an activity library;
presenting on the display a virtual tour experience in accordance with the first predefined activity, wherein the process of presenting further comprises presenting a video presented on the display adjacent the avatar position and in correlation with a lecture presented through the avatar; and
animating the avatar to perform a demonstration on the display adjacent the avatar position in correlation with a lesson.

15. The non-transitory computer-readable medium storing program code of claim 14, wherein the step of presenting a contextual overlay further comprises:
presenting one or more interactive elements each associated with additional content;
detecting a current fingertip location relative to a touchpad coupled to the eyewear device;
presenting a movable element at a current element position on the display in accordance with the detected current fingertip location;
detecting, in the captured frames of video data, a navigating action relative to a first interactive element positioned on the display nearest the current element position; and
presenting the additional content on the display in response to the detected navigating action.

16. The non-transitory computer-readable medium storing program code of claim 14, wherein the program code, when executed, is operative to cause an electronic processor to perform the further steps of:
receiving human speech with the microphone;
converting the received speech into frames of audio data;
identifying, with a voice recognition module coupled to the eyewear device, a first inquiry based on the frames of audio data; and
playing a first response through the loudspeaker in response to the identified first inquiry.

* * * * *